(12) United States Patent
Anandan

(10) Patent No.: US 10,797,320 B2
(45) Date of Patent: Oct. 6, 2020

(54) CELL DESIGN TO PREVENT OVER-DISCHARGE IN LI-ION BATTERIES

(71) Applicant: FORD GLOBAL TECHNOLOGIES, LLC, Dearborn, MI (US)

(72) Inventor: Venkataramani Anandan, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 78 days.

(21) Appl. No.: 16/127,451

(22) Filed: Sep. 11, 2018

(65) Prior Publication Data

US 2020/0083537 A1 Mar. 12, 2020

(51) Int. Cl.
| | | |
|---|---|---|
| *H01M 4/62* | (2006.01) | |
| *H01M 10/0525* | (2010.01) | |
| *H01M 2/34* | (2006.01) | |
| *H01M 10/0585* | (2010.01) | |
| *H01M 4/36* | (2006.01) | |
| *H01M 4/02* | (2006.01) | |

(52) U.S. Cl.
CPC ............ *H01M 4/628* (2013.01); *H01M 2/34* (2013.01); *H01M 4/366* (2013.01); *H01M 10/0525* (2013.01); *H01M 10/0585* (2013.01); *H01M 2004/027* (2013.01)

(58) Field of Classification Search
CPC ....................... H01M 4/628; H01M 10/0525
See application file for complete search history.

(56) References Cited

U.S. PATENT DOCUMENTS

| | | | |
|---|---|---|---|
| 5,909,103 A * | 6/1999 | Williams | H02J 7/0029 320/134 |
| 6,080,508 A | 6/2000 | Dasgupta et al. | |
| 7,879,495 B2 * | 2/2011 | Howard | H01M 4/133 429/231.95 |
| 9,640,834 B2 | 5/2017 | Lee et al. | |
| 2011/0244324 A1 * | 10/2011 | Jang | H01M 4/661 429/211 |
| 2015/0030909 A1 * | 1/2015 | Ihlefeld | H01M 10/0562 429/162 |
| 2019/0181420 A1 * | 6/2019 | Senoue | H01M 4/1391 |

FOREIGN PATENT DOCUMENTS

JP 5343500 B2 11/2013

OTHER PUBLICATIONS

Kasnatscheew, J. et al., "Lithium ion battery cells under abusive discharge conditions: Electrode potential development and interactions between positive and negative electrode," Journal of Power Sources 362 (2017), pp. 278-282.

* cited by examiner

*Primary Examiner* — Matthew J Merkling
(74) *Attorney, Agent, or Firm* — David B. Kelley; Brooks Kushman P.C.

(57) ABSTRACT

According to an embodiment, a lithium-ion battery includes a cathode, an anode, a separator between the cathode and anode, a current collector on the anode, and a layer of electronically conducting material between the anode and current collector. The layer of electronically conducting material is configured to, responsive to a potential of the battery crossing a phase-transition potential of the electronically conducting material, phase-transition from a conductor to an insulator to prevent dissolution of metal ions from the current collector into the anode.

15 Claims, 3 Drawing Sheets

CELL DESIGN TO PREVENT OVER-DISCHARGE IN LI-ION BATTERIES

TECHNICAL FIELD

The present disclosure relates to lithium ion batteries, and more particularly, components to protect a cell from over-discharging.

BACKGROUND

Conventional lithium ion batteries typically undergo abuse issues, which can cause capacity degradation, lower cycle life, and short circuiting, which can lead to thermal runaway. Over-discharging is one of the common abuse problems in lithium ion batteries. When the battery is over-discharged, the potential at the graphite anode can increase sharply, and reach a plateau of about 3.56 V vs. Li/Li+, as shown in FIG. 1, and the solid electrolyte interphase decomposes, as illustrated in FIG. 2. This plateau represents the potential at which the oxidation (corrosion) of copper from the anode current collector can occur. Oxidation of copper can result in the dissolution of copper ions into the electrolyte. The oxidation of copper ions at various states (a) to (f) during over-discharge is illustrated in FIG. 2. In FIG. 2, a conventional lithium ion battery 100, or cell, includes a cathode 110, an anode 120, and a separator 130 therebetween. The anode 120 includes an active material and an electrolyte, which form a solid electrolyte interphase layer 150 during cell operation. The conventional battery 100 further includes a copper anode current collector 140 and a cathode current collector 145 on the cathode 110. As shown in FIG. 2, copper ions 160 begin to dissolute into the electrolyte and travel through the separator after the solid electrolyte interphase layer 150 decomposes, and form deposits 165 on the cathode surface. As the over-discharge state proceeds, the deposited copper ions 165 can grow, forming an internal short circuit in the cell.

SUMMARY

According to an embodiment, a lithium-ion battery includes a cathode, an anode, a separator between the cathode and anode, a current collector on the anode, and a layer of lithiated lithium titanate (LTO) between the anode and current collector, configured to, responsive to a potential of the battery crossing a phase-transition potential of the lithiated LTO, delithiate to phase-transition from a conductor to an insulator to prevent dissolution of metal ions from the current collector into the anode.

According to one or more embodiments, the phase-transition potential may be 1.5 V. In at least one embodiment, the anode current collector may be a copper current collector. In certain embodiments, the layer may have a conductivity of 2.4 S/cm at potentials below the phase-transition potential. In some embodiments, the layer may have a conductivity of less than $10^{-6}$ S/cm at potentials above the phase-transition potential. In one or more embodiments, the layer of lithiated LTO may include a binder.

According to an embodiment, a lithium-ion battery includes a cathode, an anode, a separator between the cathode and anode, a current collector on the anode, and a layer of electronically conducting material between the anode and current collector. The layer of electronically conducting material is configured to, responsive to a potential of the battery crossing a phase-transition potential of the electronically conducting material, phase-transition from a conductor to an insulator to prevent dissolution of metal ions from the current collector into the anode.

According to one or more embodiments, the phase-transition potential may be 1.5 V to 3.5 V. In at least one embodiment, the layer of electronically conducting material may be a composite layer including a polymer component. In one or more embodiments, the layer of electronically conducting material may include a lithiated lithium titanate (LTO) material. According to at least one embodiment, the layer of electronically conducting material may deintercalate at a potential of 1.5 V to begin phase-transition. In some embodiments, the layer of electronically conducting material may have a conductivity of at least $10^{-2}$ S/cm at potentials below the phase-transition potential. In at least one embodiment, the anode current collector may be a copper current collector. In certain embodiments, the layer of electronically conducting material may include a binder. According to at least one embodiment, above the phase-transition potential, the layer of electronically conducting material may have a conductivity of less than $10^{-6}$ S/cm.

According to an embodiment, a method of operating a lithium-ion battery includes providing a lithium-ion battery including a cathode, an anode, a separator between the cathode and anode, an anode current collector, and an electronically conductive layer between the anode current collector and anode, and discharging the lithium-ion battery at a discharge potential. Responsive to the discharge potential exceeding a phase-transition potential, the electronically conducting layer phase-transitions from a conductor to an insulator via delithiation to prevent dissolution of metal ions from the current collector into the anode.

According to one or more embodiments, the phase-transition potential may be 1.5 V to 3.5 V. In at least one embodiment, below the phase-transition potential, the electronically conductive layer may be the conductor having a conductivity of at least 10-2 S/cm, and above the phase-transition potential, the electronically conductive layer may be the insulator having a conductivity of less than 10-6 S/cm. In some embodiments, the electronically conductive layer is a composite layer blended with a polymer. In one or more embodiments, providing the lithium-ion battery may include coating the electronically conductive layer on the anode current collector by slurry casting or vapor deposition.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities and ranges in this disclosure are to be understood as modified by the word "about". Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

According to embodiments of the present disclosure, a lithium-ion battery cell design is provided. The lithium-ion battery includes a layer of an electronically conducting material (ECM) between the graphite of the anode and the anode current collector. The ECM is electronically conductive at normal charge and discharge potentials (up to 1 V vs. Li/Li+). The ECM undergoes a phase-transition and converts to an insulator at a potential less than the oxidation potential of the anode current collector (vs. Li/Li+), such that the anode current collector is insulated from the cell during over-discharge to prevent oxidation of the anode current collector and dissolution of metal ions from the current collector into the cell. Furthermore, the ECM may be selected to be as thin of a layer as possible to provide the insulation and lower cell resistance.

Figure 3:
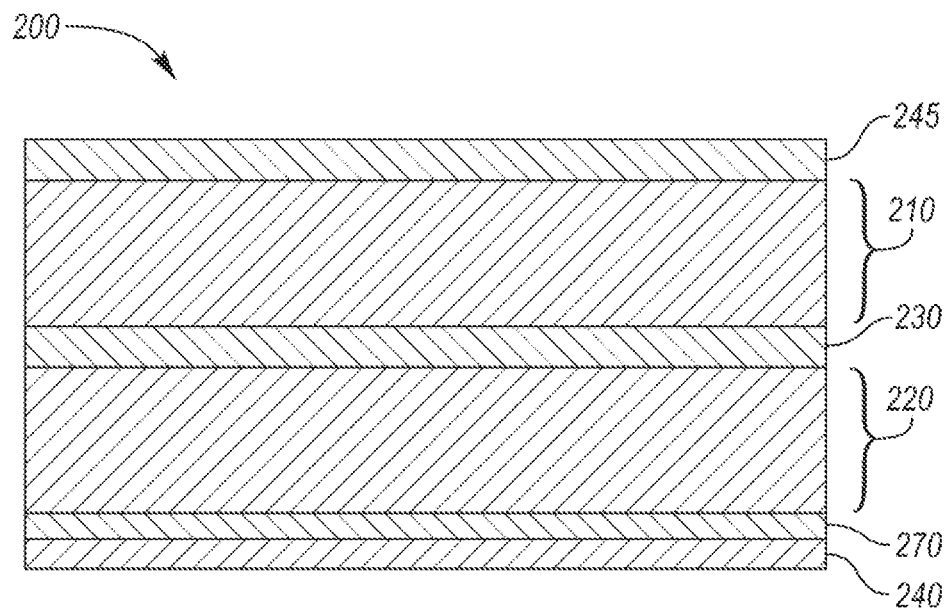
FIG. 3 is a schematic illustration of a cross-section of a lithium-ion battery, according to an embodiment.

Referring to FIG. 3, a lithium ion battery 200, or cell, is shown according to an embodiment. The Li-ion battery electrodes operate by intercalation of lithium ions, wherein the lithium ions are extracted from the anode and migrate to the cathode during discharge and are extracted from the cathode and migrate to the anode during charging. The cell 200 includes a cathode 210, an anode 220, and a separator 230 therebetween. The separator 230 may be any material suitable for use in commercial Li-ion cells, such as, but not limited to porous polymer separators, with or without ceramic coatings. Examples of separators include polyethylene, polypropylene, and polyolefin separators. The anode 220 includes an active material (not shown), and an electrolyte (not shown). It should be understood that any suitable Li-ion electrolyte, such as, as a non-limiting example, lithium salts, is contemplated. The anode 220 may be formed of any suitable active material, such as, but not limited to graphite, silicon, carbon-silicon composites, and the like. Similarly, the cathode 210 may be formed of any suitable material, for example lithium nickel cobalt aluminum oxide (NCA), lithium nickel manganese cobalt oxide (NMC), lithium manganese spinel oxide (Mn Spinel or LMO), and lithium iron phosphate (LFP) and its derivatives lithium mixed metal phosphate (LFMP). In addition, mixtures of any of two or more of these materials may be used, for example a mixture of NMC and LMO. The battery 200 further includes an anode current collector 240. In at least one embodiment, the anode current collector 240 is a copper current collector. The battery 200 also includes a cathode current collector 245 on the cathode 210. The cathode current collector 245 is a metal current collector with high conductivity, such as, but not limited to, aluminum. Other cathode current collector materials contemplated include, but are not limited to, titanium, nickel, silver, palladium, and the like.

The lithium ion battery 200 further includes a layer of an electronically conducting material (ECM) 270, or interchangeably phase-transition material 270, on the anode current collector 240, between the anode 220 and the current collector 240. The ECM 270 is an electronically conducting material at normal charge and discharge potential, and provides electronic conduction between the active material of the anode 220 and the anode current collector 240 during normal charge and discharge states. The ECM 270 may have a conductivity of $10^{-1}$ to $10^5$ S/cm. In at least one embodiment, the ECM 270 is selected such that it is capable of intercalation and deintercalation at a potential between 1.0 V and 3.5 V. In at least one embodiment, the ECM 270 is only an ECM layer. In other embodiments, the ECM may be a composite layer including the ECM blended with a polymer. The ECM may be coated onto the anode current collector, or on to the anode. The ECM may be coated using slurry casting or any vapor deposition technique, such as, but not limited to plasma or chemical vapor deposition.

Figure 1A:
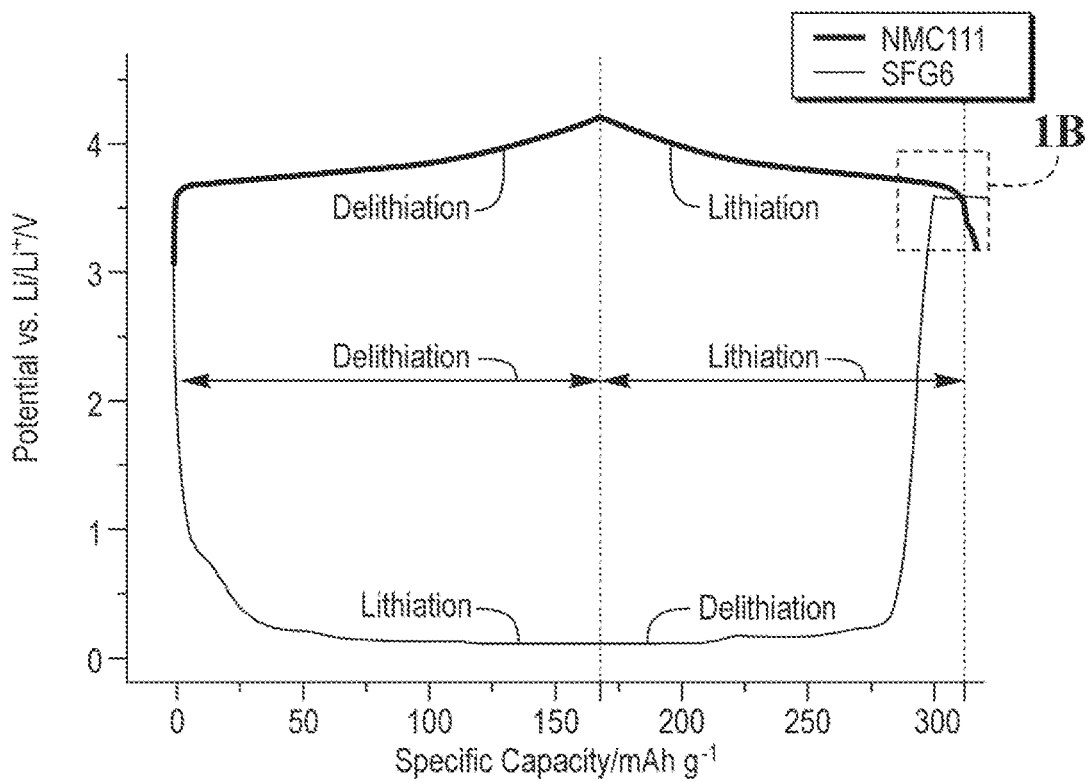
FIGS. 1A and 1B are graphs illustrating potential during charge, discharge, and over-discharge conditions in a conventional lithium-ion battery.
Figure 1B:
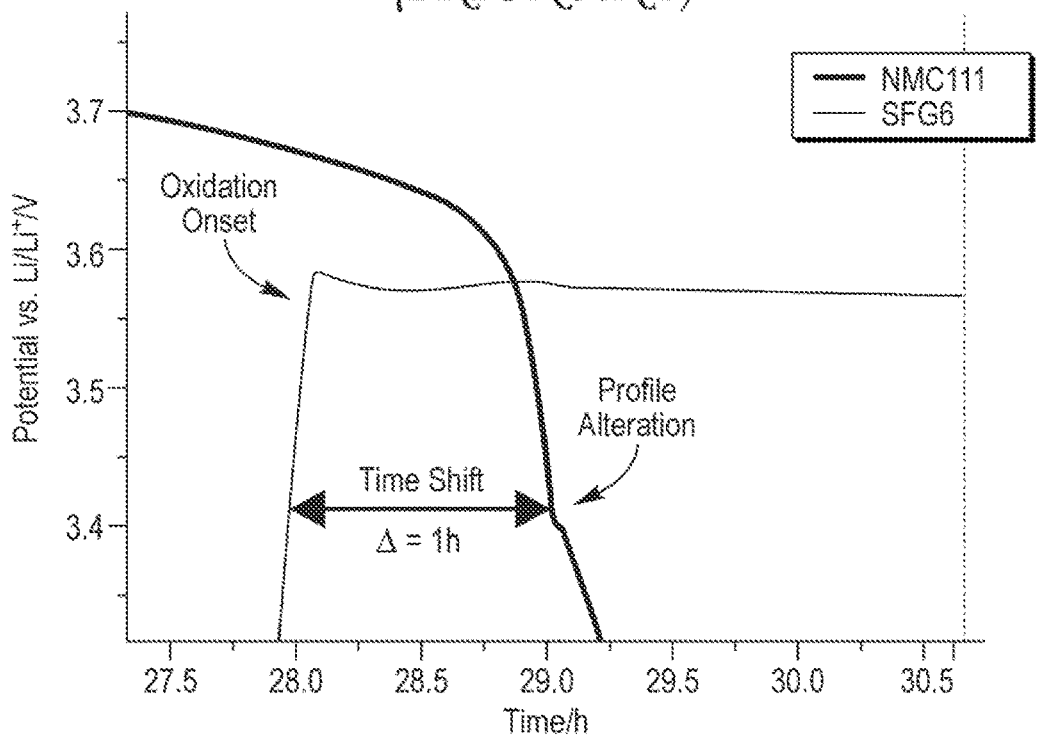
Figure 2:
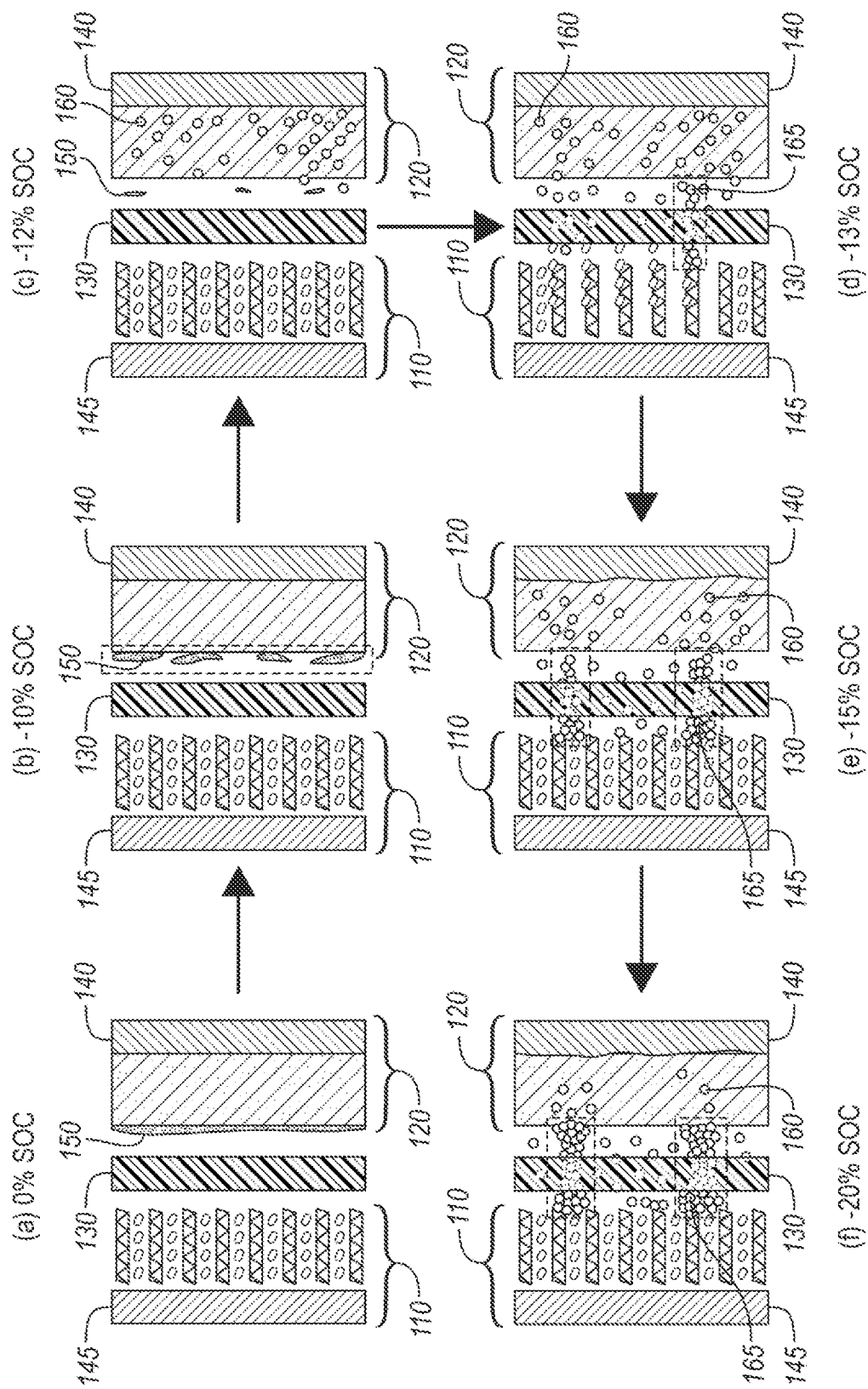
FIG. 2 is a schematic illustration of copper dissolution at various stages of over-discharge in a conventional lithium-ion battery.

Upon over-discharge conditions, the layer of ECM 270 converts (i.e., undergoes a phase-transition) to an insulator to open the circuit and stop the discharge process. The ECM 270 converts to an insulator at a potential below the oxidation potential of the metal of the anode current collector 240. As an insulator, the ECM 270 may have a conductivity of less than $10^{-7}$ S/cm. Unlike conventional cells where the potential of the anode can rise sharply, to 3.56 V for example, as shown in FIG. 1, the layer of ECM 270 converts to an insulating layer at a potential lower than the oxidation potential of current collector 240, preventing metal ion dissolution from the current collector 240. Thus, any further discharging will result in the potential of the cell 100 rising and plateauing at the phase-transition (or deintercalation) potential of the ECM 270 until it is fully deintercalated, thus becoming an insulator and opening the circuit to prevent further discharge. In one or more embodiments, for example when the anode current collector 240 is a copper current collector, the ECM 270 converts to an insulator at a potential of 1 to 3.5 V vs. Li/Li+.

Figure 4:
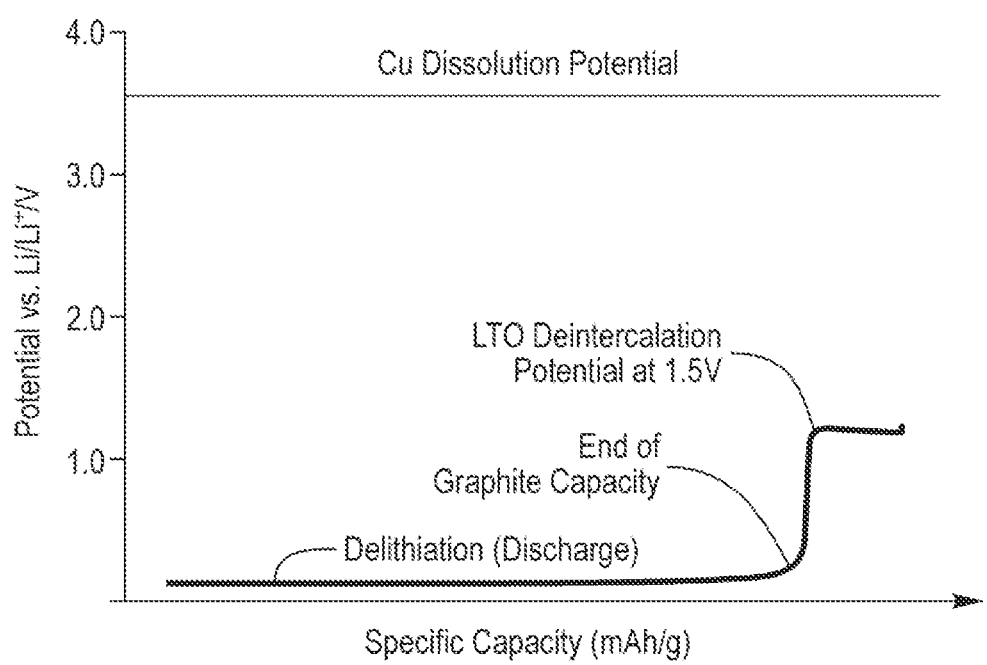
FIG. 4 is a graph illustrating potential during discharge and over-discharge conditions in a lithium-ion battery, according to an embodiment.

According to at least one embodiment, the ECM 270 includes, for example, a lithiated lithium-titanate (LTO) material between the anode 220 and anode current collector 240. The LTO layer may be a lithiated LTO alone (pristine) or be lithiated LTO with a binder. Unlike pristine LTO, which is an insulator having a conductivity of ~$1 \times 10^{-8}$ S/cm, lithiated LTO has an electronic conductivity of ~2.5 S/cm, providing sufficient conductivity between the anode 120 and anode current collector 140 during normal charge and discharge states. The electronically conducting lithiated LTO undergoes a phase-transition to an insulator when it is delithiated (deintercalated). The phase-transition potential of lithiated LTO is ~1.5 V. In an over-discharge state, the potential of the anode 220 will rise to the potential of phase transition material 270, for example, 1.55 V for lithiated LTO material, as shown in FIG. 4. The plateau occurs at 1.55 V instead of rising to 3.56 V because the deintercalation potential of LTO is 1.55 V, thus preventing the potential reaching 3.56 V where a copper current collector would oxidize. Thus, the phase-transition layer 270 insulates the current collector 240 from the anode 220, opening the circuit to stop the discharge process.

According to embodiments of the present disclosure, a lithium-ion battery cell design includes a layer of an electronically conducting material (ECM) between the anode and the anode current collector. The ECM is electronically conductive at normal charge and discharge potentials (up to 1 V vs. Li/Li+). The ECM undergoes a phase-transition and converts to an insulator at a potential between below the oxidation potential of the current collector, such that the anode current collector is insulated from the cell during over-discharge to prevent corrosion of the anode current collector and dissolution of metal ions from the current collector into the cell.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lithium-ion battery comprising:
   a cathode:
   an anode including an active material with a first reaction potential;
   a separator between the cathode and anode;
   a current collector on the anode and having a decomposition potential greater than the first reaction potential; and
   a layer of lithiated lithium titanate (LTO) between the anode and current collector, configured to, responsive to an over-discharge state where a potential of the battery crosses a phase-transition potential of the lithiated LTO, delithiate to phase-transition from a conductor to an insulator to prevent dissolution of metal ions from the current collector into the anode,
   wherein the phase transition potential is between the first reaction potential and the decomposition potential.

2. The lithium-ion battery of claim 1, wherein the phase-transition potential is 1.5 V.

3. The lithium-ion battery of claim 1, wherein the anode current collector is a copper current collector.

4. The lithium-ion battery of claim 1, wherein the layer has a conductivity of 2.4 S/cm at potentials below the phase-transition potential.

5. The lithium-ion battery of claim 1, wherein the layer has a conductivity of less than $10^{-6}$ S/cm at potentials above the phase-transition potential.

6. The lithium-ion battery of claim 1, wherein the layer of lithiated LTO includes a binder.

7. A lithium-ion battery comprising:
   a cathode;
   an anode;
   a separator between the cathode and anode;
   a current collector on the anode; and
   a layer of electronically conducting material between the anode and current collector, configured to, responsive to an over-discharge state where a potential of the battery crosses a phase-transition potential of the electronically conducting material, phase-transition from a conductor to an insulator to prevent dissolution of metal ions from the current collector into the anode,
   wherein the phase-transition potential is between an anode active material potential and a current collector decomposition potential.

8. The lithium-ion battery of claim 7, wherein the phase-transition potential is 1.5 V to 3.5 V.

9. The lithium-ion battery of claim 7, wherein the layer of electronically conducting material is a composite layer including a polymer component.

10. The lithium-ion battery of claim 7, wherein the layer of electronically conducting material includes a lithiated lithium titante (LTO) material.

11. The lithium-ion battery of claim 7, wherein the layer of electronically conducting material deintercalates at a potential of 1.5 V to begin phase-transition.

12. The lithium-ion battery of claim 7, wherein, below the phase-transition potential, the layer of electronically conducting material has a conductivity of at least $10^{-2}$ S/cm.

13. The lithium-ion battery of claim 7, wherein the anode current collector is a copper current collector.

14. The lithium-ion battery of claim 7, wherein the layer of electronically conducting material includes a binder.

15. The lithium-ion battery of claim 7, wherein, above the phase-transition potential, the layer of electronically conducting material has a conductivity of less than $10^{-6}$ S/cm.

* * * * *